(12) United States Patent
Mazzoccoli et al.

(10) Patent No.: US 10,702,853 B2
(45) Date of Patent: Jul. 7, 2020

(54) CHLORAMINE AND CHLORINE REMOVAL MATERIAL AND METHODS FOR MAKING THE SAME

(71) Applicant: CALGON CARBON CORPORATION, Moon Township, PA (US)

(72) Inventors: Jason Mazzoccoli, Pittsburgh, PA (US); Walter G. Tramposch, Moon Township, PA (US); Ryan Walker, Pittsburgh, PA (US); Robert H. Vaughn, Bethel Park, PA (US)

(73) Assignee: CALGON CARBON CORPORATION, Moon Township, PA (US)

( * ) Notice: Subject to any disclaimer, the term of this patent is extended or adjusted under 35 U.S.C. 154(b) by 0 days.

(21) Appl. No.: 15/895,410

(22) Filed: Feb. 13, 2018

(65) Prior Publication Data

US 2018/0229217 A1  Aug. 16, 2018

Related U.S. Application Data

(60) Provisional application No. 62/458,371, filed on Feb. 13, 2017.

(51) Int. Cl.
| | | |
|---|---|---|
| *B01J 20/30* | (2006.01) | |
| *B01J 20/20* | (2006.01) | |
| *B01J 20/22* | (2006.01) | |
| *B01J 21/18* | (2006.01) | |
| *B01J 31/02* | (2006.01) | |
| *C02F 1/28* | (2006.01) | |
| *B01J 20/28* | (2006.01) | |
| *C02F 101/12* | (2006.01) | |

(52) U.S. Cl.
CPC ........... *B01J 20/3085* (2013.01); *B01J 20/20* (2013.01); *B01J 20/22* (2013.01); *B01J 20/28004* (2013.01); *B01J 20/3078* (2013.01); *B01J 21/18* (2013.01); *B01J 31/0235* (2013.01); *C02F 1/283* (2013.01); *C02F 2101/12* (2013.01); *C02F 2303/185* (2013.01)

(58) Field of Classification Search
CPC ........ B01J 20/3085; B01J 20/20; B01J 20/22; B01J 20/28004; B01J 20/3078; B01J 21/18; B01J 31/0235; C02F 1/283
See application file for complete search history.

(56) References Cited

U.S. PATENT DOCUMENTS

| | | | |
|---|---|---|---|
| 4,624,937 A | 11/1986 | Chou et al. | |
| 4,921,826 A | 5/1990 | Juntgen et al. | |
| 5,338,458 A | 8/1994 | Carrubba et al. | |
| 5,356,849 A | 10/1994 | Matviya et al. | |
| 5,504,050 A * | 4/1996 | Hayden | B01J 21/18 423/579 |
| 6,342,129 B1 | 1/2002 | Vaughn et al. | |
| 6,706,194 B2 * | 3/2004 | Baker | B01J 20/20 210/668 |
| 7,361,280 B2 † | 4/2008 | Baker | |
| 7,923,410 B2 | 4/2011 | Turk et al. | |
| 9,120,079 B1 | 9/2015 | Dietz et al. | |
| 9,174,205 B2 | 11/2015 | Reimerink-Schats et al. | |
| 2008/0073290 A1 * | 3/2008 | Ryan | C02F 1/283 210/749 |
| 2011/0076210 A1 | 3/2011 | Pollack et al. | |
| 2016/0023920 A1 | 1/2016 | Doyle et al. | |
| 2016/0236169 A1 | 8/2016 | Doughty et al. | |
| 2016/0346723 A1 | 12/2016 | Honore et al. | |

FOREIGN PATENT DOCUMENTS

| | | | |
|---|---|---|---|
| CA | 2485103 | † | 11/2003 |
| DE | 3620425 C1 | | 6/1987 |
| JP | H01-058331 | | 3/1989 |

OTHER PUBLICATIONS

International Search Report and Written Opinion for PCT/US2018/017973 dated May 29, 2018.
Sharifi et al., "Formation of Active Sites for Oxygen Reduction Reactions by Transformation of Nitrogen Functionalities in Nitrogen-Doped Carbon Nanotubes." ACS Nano, vol. 6, No. 10, 2012, pp. 8904-8912, doi:10.1021/nn302906r.
"The Chemistry of Nitrogen and Phosphorous." Purdue Chemistry, Purdue University, (2006). chemed.chem.purdue.edu/genchem/topicreview/bp/ch10/group5.php#negative.

* cited by examiner
† cited by third party

*Primary Examiner* — Melvin C. Mayes
*Assistant Examiner* — Michael Forrest
(74) *Attorney, Agent, or Firm* — Pepper Hamilton LLP

(57) ABSTRACT

Sorbent materials are described that have enhanced performance in removing chlorine and chloramine, among other toxic compounds. The sorbent materials are formed by a process which includes steps of oxidation, adding a nitrogen-containing compound, and calcining the sorbent. The processes of forming the sorbent materials are also disclosed. The sorbent materials have excellent performance as measured by a chloramine and/or chlorine destruction number, and the sorbents retain a high nitrogen edge concentration. The sorbent materials may also be incorporated into devices such as filter assemblies.

36 Claims, 3 Drawing Sheets

CHLORAMINE AND CHLORINE REMOVAL MATERIAL AND METHODS FOR MAKING THE SAME

CROSS-REFERENCE TO RELATED APPLICATIONS

This application claims priority to U.S. Provisional Application 62/458,371 filed on Feb. 13, 2017, the entire contents of which is incorporated by reference.

GOVERNMENT INTERESTS

Not applicable

PARTIES TO A JOINT RESEARCH AGREEMENT

Not applicable

INCORPORATION BY REFERENCE OF MATERIAL SUBMITTED ON A COMPACT DISC

Not applicable

BACKGROUND

Sorbent materials having high surface areas and which have been chemically modified to have catalytic properties are well known for their oxidative and decomposition properties. These properties find use in a variety of fields, in particular the removal and destruction of chlorine, chloramine, trihalomethanes, haloacetic acids, and hydrogen peroxides which are formed when water is disinfected. The sorbent materials are typically formed from various activated carbons and carbonaceous chars which are thermally treated with a nitrogen containing precursor followed by activation to produce the catalytic activated carbon. Alternately, a nitrogen containing precursor can be charred and activated. Activation is normally carried out at high temperature with an activating gas such as steam (water), carbon dioxide, or oxygen. These methods are described in several U.S. patents, including U.S. Pat. Nos. 6,342,129, 6,706,194, 5,356,849, 5,338,458, and 9,174,205, all of which are incorporated by reference in their entirety.

There are disadvantages to the prior art nitrogen pretreatment and activation techniques. The activation process gasifies the surface portion of the carbonaceous char or other sorbent material, which results in small pores being formed as the carbon or other material on the surface of the sorbent particles vaporizes. These pores are responsible for the high total surface area of the sorbent material, and therefore its high performance. However, this gasification during the activation process is not selective to the materials being removed from the surface through vaporization. As a result, much of the incorporated nitrogen which is responsible for the catalytic activity and which is part of the surface skeleton of the sorbent material is removed during the activation process. This is counterproductive and reduces the catalytic properties of the sorbent materials, and therefore its performance in the removal and destruction of deleterious compounds from water.

There is a need for a process which permits the sorbent materials to not only be formed having high surface area that provides for the sorbent properties, but also for the sorbent materials to have increased catalytic functionality. The present invention solves the above and other problems with a novel process that permits sorbents to be formed having both high surface area and excellent catalytic activity.

SUMMARY OF THE INVENTION

The invention discloses methods for making sorbents, well as the sorbents which are made by the inventive processes. The invention further discloses filter assemblies which are formed by including the sorbents disclosed herein. The disclosed embodiments include:

1. A method for making a sorbent, comprising:
   providing a sorbent feedstock,
   oxidizing the sorbent feedstock,
   adding a nitrogen containing precursor to the sorbent feedstock, wherein the nitrogen containing precursor is a reduced nitrogen compound, and
   heating the sorbent feedstock to a temperature of at least about 400° C. under an inert atmosphere.
2. The method of embodiment 1, wherein the nitrogen containing precursor has an oxidation state of −3.
3. The method of embodiment 2, wherein the nitrogen containing precursor is selected from the group consisting of ammonia, ammonium salts, ammonium carbonate and bicarbonate, ammonium thiocyanate, azodicarbonamide, diammonium phosphate, dicyandiamide, guanidine hydrochloride, guanidine thiocyanate, guanine, melamine, thiourea, urea, and combinations thereof.
4. The method of embodiment 1, wherein the step of heating takes place at a temperature of at least about 700° C.
5. The method of embodiment 1, wherein the oxidized sorbent feedstock is selected from the group consisting of carbonaceous char, activated carbon, reactivated carbon, carbon black, graphite, zeolite, silica, silica gel, alumina clay, metal oxides, graphenes, carbon nanotubes, and combinations thereof.
6. The method of embodiment 1, wherein the sorbent feedstock is activated carbon and the activated carbon is formed from bituminous coal, sub-bituminous coal, lignite coal, anthracite coal, peat, nut shells, pits, coconut shell, babassu nut, macadamia nut, dende nut, peach pit, cherry pit, olive pit, walnut shell, wood, lignin, polymers, nitrogen-containing polymers, resins, petroleum pitches, rice hulls, bagasse, corn stalks, wheat hulls, graphenes, carbon nanotubes, and combinations thereof.
7. The method of embodiment 1, wherein the steps of oxidizing, adding a nitrogen containing precursor, and heating are each individually performed from one to six (1-6) times.
8. The method of embodiment 1, wherein the sorbent feedstock has a mean particle diameter of about 1 μm to about 4 mm.
9. The method of embodiment 1, wherein the formed sorbent has a chloramine destruction number (CDN) of at least about 4.0,
   wherein the CDN is the absolute value of the first order linear kinetic fit, multiplied by 1000, that is applied to natural log of a concentration of chloramine in water versus time,
   wherein the initial concentration of chloramine is decreased over a period of 150 minutes.
10. The method of embodiment 9, wherein the formed sorbent has a CDN of about 10.0 to about 30.0.
11. The method of embodiment 9, wherein the CDN is based on the destruction of monochloramine.

12. The method of embodiment 1, wherein the formed sorbent has a chlorine destruction number (Cl-DN) of at least about 80.0,
   wherein the Cl-DN is the absolute value of the first order linear kinetic fit, multiplied by 1000, that is applied to natural log of a concentration of chlorine in water versus time,
   wherein the initial concentration of chlorine is decreased over a period of 150 minutes.

13. The method of embodiment 12, wherein the Cl-DN value is about 80.0 to about 100.0.

14. The method of embodiment 1, wherein the formed sorbent has a nitrogen edge concentration of at least about 0.20 atom %.

15. The method of embodiment 14, wherein the formed sorbent has a nitrogen edge concentration of about 0.20 atom % to about 1.2 atom %.

16. The method of embodiment 1, wherein the step of oxidizing the sorbent feedstock is conducted in the temperature range of about 400° C. to about 900° C.

17. The method of embodiment 1, wherein the step of oxidizing the sorbent feedstock is performed in a dry atmosphere.

18. The method of embodiment 1, wherein the step of oxidizing the sorbent feedstock is performed in a humidified atmosphere.

19. The method of embodiment 1, wherein the steps of providing, oxidizing, adding, and heating are performed in that listed order.

20. The method of embodiment 1, further comprising a step of adding a sorbent feedstock which has not been treated in the amount of about 5 wt. % to about 95 wt. % based on the total amount of the formed sorbent.

21. A sorbent formed by a method comprising the steps of:
   providing a sorbent feedstock,
   oxidizing the sorbent feedstock,
   adding a nitrogen containing precursor to the sorbent feedstock, wherein the nitrogen containing precursor is a reduced nitrogen compound
   heating the sorbent feedstock to a temperature of at least about 400° C. under an inert atmosphere.

22. The sorbent of embodiment 21, wherein the nitrogen containing precursor has an oxidation state of −3.

23. The sorbent of embodiment 22, wherein the nitrogen containing precursor is selected from the group consisting of ammonia, ammonium carbonate and bicarbonate, ammonium thiocyanate, azodicarbonamide, diammonium phosphate, dicyandiamide, guanidine hydrochloride, guanidine thiocyanate, guanine, melamine, thiourea, urea, and combinations thereof.

24. The sorbent of embodiment 21, wherein the sorbent feedstock has a mean particle diameter of about 1 μm to about 4 mm.

25. The sorbent of embodiment 21, wherein the sorbent has a chloramine destruction number (CDN) of at least about 4.0,
   wherein the CDN is the absolute value of the first order linear kinetic fit, multiplied by 1000, that is applied to natural log of a concentration of chloramine in water versus time,
   wherein the initial concentration of chloramine is decreased over a period of 150 minutes.

26. The sorbent of embodiment 25, wherein the CDN is about 10.0 to about 30.0.

27. The sorbent of embodiment 26, wherein the CDN is based on the destruction of monochloramine.

28. The sorbent of embodiment 21, wherein the sorbent has a chlorine destruction number (Cl-DN) of at least about 80.0,
   wherein the Cl-DN is the absolute value of the first order linear kinetic fit, multiplied by 1000, that is applied to natural log of a concentration of chlorine in water versus time,
   wherein the initial concentration of chlorine is decreased over a period of 150 minutes.

29. The sorbent of embodiment 28, wherein the CDN is about 80.0 to about 100.0

30. The sorbent of embodiment 21, wherein the sorbent has a nitrogen edge concentration of at least about 0.20 atom %.

31. The sorbent of embodiment 30, wherein sorbent has a nitrogen edge concentration of about 0.20 atom % to about 1.2 atom %.

32. The sorbent of embodiment 21, further comprising a sorbent feedstock which has not been treated in the amount of about 5 wt. % to about 95 wt. % based on the total amount of the sorbent.

33. A filter assembly comprising the sorbent of embodiment 21.

DETAILED DESCRIPTION

Figure 1:
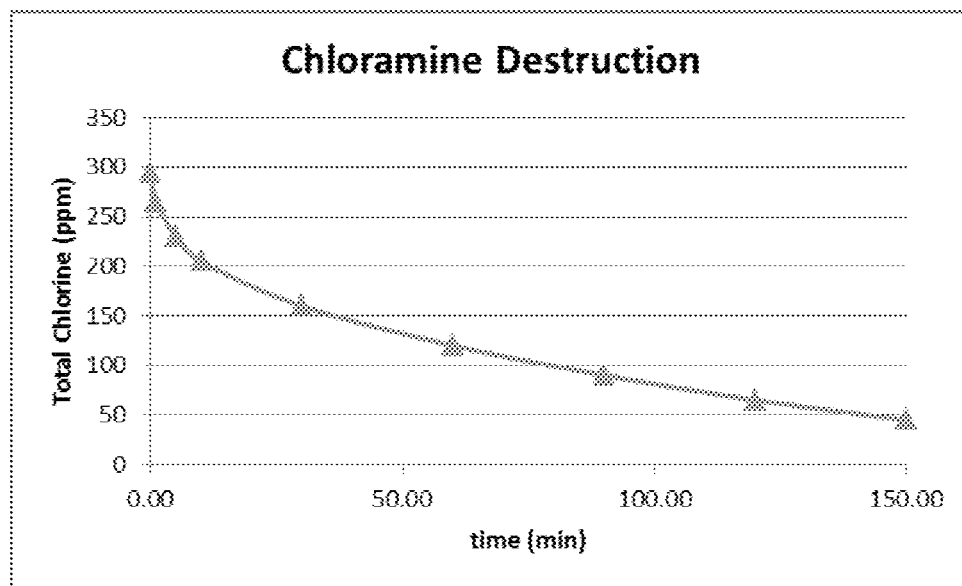
FIG. 1 is a plot of the destruction of chloramine in water over time when exposed to the sorbents of the invention

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention, which will be limited only by the appended claims. Unless defined otherwise, all technical and scientific terms used herein have the same meaning as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference in their entirety. Nothing herein is to be construed as an admission that the invention is not entitled to antedate such disclosure by virtue of prior invention.

It must also be noted that as used herein and in the appended claims, the singular forms "a", "an", and "the" include plural reference unless the context clearly dictates otherwise. Thus, for example, reference to "a combustion chamber" is a reference to "one or more combustion chambers" and equivalents thereof known to those skilled in the art, and so forth.

As used herein, the term "about" means plus or minus 10% of the numerical value of the number with which it is being used. Therefore, about 50% means in the range of 45%-55%.

As used herein, the term "may" means that the later described element can either be present or that it can be excluded. For example, describing that the sorbent may include an additive means that the additive can be included, or that the additive can be excluded.

In some embodiments, the invention discloses compositions for the removal of chloramine, chlorine, peroxides, and other deleterious compounds using sorbents and methods for making such sorbents. In other embodiments, the invention discloses devices and apparatus such as filters that contain the catalytic adsorbent material. The devices and apparatus include water filters and respirators. In other embodiments, the invention is directed to methods of using these devices and apparatus for the removal of harmful compounds such as chloramine, chlorine, and peroxides.

Various embodiments are directed to methods for making a sorbent and sorbents prepared by such methods. The methods may generally include the step of oxidizing a feedstock before adding a nitrogen containing precursor. The step of oxidizing can be carried out by various means. For example, in some embodiments, the oxidizing can be carried out by exposing the feedstock to an oxygen containing environment and heating the feedstock to a temperature of about 150° C. to about 1050° C. The temperature of oxidizing can be about 150° C. to about 250° C., about 250° C. to about 350° C., about 350° C. to about 450° C., about 450° C. to about 550° C., about 550° C. to about 650° C., about 650° C. to about 750° C., about 750° C. to about 850° C., about 850° C. to about 950° C., about 950° C. to about 1050° C., or any of those disclosed endpoints, or any range that is made of a combination of any of the above ranges or values within those ranges.

The oxidizing step can be performed with an oxygen containing environment that contains atmospheric air, oxygen, steam, ozone, oxygen plasma, nitrogen oxide, and hydrogen peroxide, carbon dioxide, or any combination of the above. In some embodiments, the oxygen containing environment is dry, and includes no moisture or substantially no measurable moisture. The oxidation environment of any of the above compounds can also be humidified. The level of humidification can be 10-20%, 20-40%, 40-60%, 60-80%, 80-100%, 100% or saturated, or values and ranges derived from any combination of the above endpoints or ranges. The above recited humidity values are for levels of humidification as measured at 25° C. at standard pressure of 1 atm. Oxidation can also be accomplished electrochemically. It should be noted that carbons slowly oxidize the presence of air with or without moisture at room temperature and this oxidation, although slow, would be eventually be sufficient to produce an oxidized carbon precursor. Alternately, the carbon may be oxidized in a non-thermal process using hydrogen peroxide, ozone, chlorine, persulfates, percarbonates, oxidizing acids such as nitric acid, air, pure oxygen or any combination thereof in the liquid or vapor phase at temperatures less than about 100° C. In some embodiments, the oxidizing step is omitted, i.e., the sorbent feedstock is not oxidized by any step faster than the above described slow oxidation that takes place naturally at room temperature under normal conditions.

The sorbent feedstock of the embodiments may be any sorbent material known in the art including carbonaceous char, activated carbon, reactivated carbon, carbon black, graphite, zeolite, silica, silica gel, alumina clay, diatomaceous earth, metal oxides, or combinations thereof. In some embodiments, the sorbent may be activated carbon or reactivated carbon. In various embodiments, the activated or reactivated carbon may be prepared from any precursor carbonaceous material known in the art including, but not limited to bituminous coal, sub-bituminous coal, lignite coal, anthracite coal, peat, nut shells, pits, coconut shell, babassu nut, macadamia nut, dende nut, peach pit, cherry pit, olive pit, walnut shell, wood, lignin, polymers, nitrogen-containing polymers, resins, petroleum pitches, bagasse, rice hulls, corn husks, wheat hulls and chaff, graphenes, carbon nanotubes, and any other carbonaceous material or combinations thereof. Additionally, the carbonaceous material may be derived from activated carbons produced from various precursors that have been in-use and subsequently reactivated and/or regenerated. In some embodiments, the sorbent feedstock is provided in a preoxidized state. In other embodiments, the sorbent feedstock is provided in an unoxidized state.

In various embodiments, after oxidation is complete, the oxidized feedstock may be contacted with a reduced nitrogen-containing compound such as ammonia, ammonium salts, ammonium carbonate and bicarbonate, ammonium thiocyanate, azodicarbonamide, diammonium phosphate, dicyandiamide, guanidine hydrochloride, guanidine thiocyanate, guanine, melamine, thiourea, and urea. The step of contacting can be carried out by any method. For example, the contacting the oxidized feedstock can be dry mixing the feedstock with a reduced nitrogen containing compound, mixing the feedstock with a solution of a reduced nitrogen containing compound, e.g. impregnation, or contacting the feedstock with a gaseous reduced nitrogen containing compound.

In other embodiments, the source of nitrogen can be the feedstock itself, alone or in combination with added reduced nitrogen-containing feedstocks and/or the various sorbents and sorbent feedstocks described above. Such feedstocks may typically include nitrogen containing monomers and polymers. The nitrogen containing feedstocks can be acrylonitrile, polyacrylonitrile, urethane, polyurethane, amides, polyamides, nitrile rubber, and combinations thereof. If nitrogen containing feedstocks are selected, these may be combined with the disclosed steps of adding further nitrogen precursors, or these can be used alone, omitting the further steps of adding nitrogen precursors. Alternatively, sorbents produced by the activation of nitrogen containing feedstocks may be mixed with the sorbents treated according to the invention as an alternative to mixing other, untreated sorbents.

In various embodiments, the feedstock may be calcined by heating to a temperature greater than about 700° C. before, during, or both before and during exposure to the nitrogen containing compound, and in particular embodiments, heating can be carried out after contacting the feedstock with a nitrogen containing compound. Calcination is, generally, carried out by heating the carbonaceous char or catalytic activated carbon to a temperature sufficient to reduce the presence of surface oxides on the carbonaceous char. The temperature at which surface oxides are removed may be about 400° C. to about 1050° C., about 400° C. to about 1000° C., about 600° C. to about 1050° C., about 800° C. to about 1050° C., about 850° C. to about 950° C., or any temperature range that incorporates the above endpoints or which falls within the scope of the above listed ranges. The temperature of the heating and/or calcining may be about 350° C., about 400° C., about 450° C., about 500° C., about 550° C., about 600° C., about 650° C., about 700° C., about 750° C., about 800° C., about 850° C., about 900° C., about 950° C., about 1000° C., about 1050° C., about 1100° C., about 1150° C., about 1200° C., or any range that is formed from any two of those values as endpoints. The calcination process atmospheres may include inert nitrogen gas or the noble gases helium, argon, neon, krypton, xenon, and radon. Heating and/or calcining can be carried out for a time period of about 1 to about 120 minutes. Following heating and/or calcining the feedstock may be cooled in an inert and/or noble gas atmosphere.

In particular embodiments, carbonaceous chars and activated carbons can be prepared by repeating the various steps of the process. For example, the steps of oxidation, exposure to nitrogen-containing compounds, calcinations may be repeated 2, 3, 4, 5, or 6 times in some embodiments, and in other exemplary embodiments, the steps of calcinations, activation, and inert cooling may be repeated 2, 3, 4, 5, or 6 times. Alternatively, any other method known to generate catalytic activity in high temperature chars may be applied to the resultant product to further enhance its catalytic activity.

Various embodiments described above may include any number of additional steps such as, but not limited to, pulverizing feedstock and/or agglomerated particles of carbonaceous char during the process of preparing activated carbon or the activated carbon itself at the end of the process, mixing, for example, a nitrogen containing compound or additional components such as binders or pitch with a carbonaceous char or an activated carbon, briquetting or forming the carbonaceous char or activated carbon, and sizing the carbonaceous char or activated carbon, and the like and any combination thereof. Such additional steps may be carried out at any time during the process, and individual steps or certain combinations of such steps may be repeated as necessary.

The sorbent may have a mean particle diameter (MPD) of about 4 mm or less, and in certain embodiments, the sorbent may have a MPD of about 1 µm to about 4 mm, about 100 µm to about 4 mm, about 0.1 mm to about 4 mm, about 0.5 mm to about 4 mm, about 1.0 mm to about 4 mm, about 4.0 µm to about 1.5 mm, about 2.0 µm to about 3.5 mm, about 1 µm to about 3 mm, any subrange contained within any of these ranges, or any range that is formed from the a combination of the endpoints of those ranges. The pore geometry of the sorbent may vary among embodiments, and the sorbent may have a distribution of pores including macropores (greater than 50 nm diameter), mesopores (2 nm to 50 nm diameter), and micropores (less than 2 nm diameter).

The pore size distribution may affect the types of materials that can be adsorbed by the sorbent. For hydrocarbon molecules especially, the propensity of a molecule to be adsorbed by the activated carbon is dependent on the pore size. Thus, the pore sizes, and the distribution of pore sizes, can be selected to determine which chemical species will or will not be adsorbed by the sorbent. A narrow pore size distribution can be used to adsorb only a few selected contaminants, while a wide pore size distribution can adsorb a greater variety of compounds.

The sorbents of various embodiments described above may be useful for use in water purification systems, and in particular, water purification systems that are used for purification of drinking water. Additional embodiments of the invention are directed to devices such as, for example, filters, filter cartridges, beds, and particulate or powdered carbon and the like, in which the adsorbent materials and adsorbent material blends described above are included.

The filters, especially consumer filters of various embodiments may have any design and may at least include a housing, including a compartment configured to hold the sorbents of the invention. The sorbent may be in various forms, such as granulated, powdered, or solid structure. As discussed throughout, these various forms can be used for sorbents such as activated carbon or any other sorbent material.

In some embodiments, the sorbent which is used in the filters is provided in the form of solid monoliths, blocks, or extruded shapes which are formed from the mixture of the sorbent material with a binder. The binder may include at least one of various polymers, adhesives, carbonizable material, and combinations thereof to produce a solid structure with the sorbent material. The binder materials may include polyolefins, polyethylene, polypropylene, polyvinyl chloride, polyethylene terephthalate, polyvinyl acetate, acrylic and acrylates, nylons and other polyesters, and combinations thereof.

The filters may include various additional components such as, for example, screens or other means for holding the activated carbon in the compartment or additional purification devices such as filtration membranes and the like. In some embodiments, the housing may include various components necessary to allow the filter to be integrated into a device such as a pitcher or bottle device in which water flows from one compartment to another and passes through the filter during transfer, a device that attaches to a water line or faucet that cause water to pass through the filter before being expelled from the faucet or otherwise delivered to a water dispensing device. In particular, the filter may include an inlet port for introducing water into the filter and an outlet port for dispensing the filtered or treated water from the filter. In some embodiments, the filter may include a removable connecting means to connect to a water source such as a sink pipe, hose, tube fittings, faucet, water fountain and the like at the inlet port.

In some embodiments, the filter may include a filter housing having an elongated envelope composed of an inert plastic material such as polystyrene, polyethylene, polypropylene, polyvinylchloride, polytetrafluoroethylene, polyethylene terephthalate, silicone, crosslinked polyethylene (PEX), or any combination thereof disposed within the filter housing for retaining the low contact pH activated carbon or mixture of low contact pH activated carbon and neutral activated carbon. The filter housing may also be made of any suitable metal, such as aluminum, steel, stainless steel, titanium, magnesium, and combinations thereof. The filter housing may also be formed of a metalized plastic, such as any of the polymers listed above with electroplated or electroless plated or vapor deposited aluminum, steel, stainless steel, titanium, magnesium, chromium, and combinations thereof. The filter housing and the envelope can be spaced from one another, and in some embodiments, a particulate filter such as, for example, filter paper may be disposed within the space to retain dust associated with the activated carbon. In particular embodiments, additional adsorbents, such as, carbon cloth may be disposed within the space. In some embodiments, the filter may include a perforated plate, slotted grate, mesh grill, screen, or other means for securing the envelope within the housing while allowing free flow of fluid through the housing.

In some embodiments, the sorbent which has been treated in accordance with the invention may be mixed with other sorbent feedstocks which have not been treated by the steps of the invention. The untreated sorbents may include carbonaceous char, activated carbon, reactivated carbon, carbon black, graphite, zeolite, silica, silica gel, alumina clay, diatomaceous earth, metal oxides, or combinations thereof. In some embodiments, these sorbents may be activated carbon or reactivated carbon. In various embodiments, the activated or reactivated carbon may be prepared from any precursor carbonaceous material known in the art including, but not limited to bituminous coal, sub-bituminous coal, lignite coal, anthracite coal, peat, nut shells, pits, coconut shell, babassu nut, macadamia nut, dende nut, peach pit, cherry pit, olive pit, walnut shell, wood, lignin, polymers, nitrogen-containing polymers, resins, petroleum pitches, bagasse, rice hulls, corn husks, wheat hulls and chaff, graphenes, carbon nanotubes, and any other carbonaceous material or combinations thereof. Additionally, the carbonaceous material may be derived from activated carbons produced from various precursors that have been in-use and subsequently reactivated and/or regenerated.

The amount of sorbent which has not been treated which is to be mixed in the treated sorbents of the invention can be any amount that is useful to achieve the desired final performance. The amount of untreated can be about 5-95 wt. %, about 20-95 wt. %, about 40-95 wt. %, about 60-95 wt. %, about 80-95 wt. %, or any combination of the previously listed ranges, based on 100% of the total mixture of treated and untreated sorbent materials. In some embodiments, the amount of untreated sorbent can be about 10 wt. %, about 20 wt. %, about 30 wt. %, about 40 wt. %, about 50 wt. %, about 60 wt. %, about 70 wt. %, about 80 wt. %, about 90 wt. %, or about 95 wt. % based on 100 wt. % of the entire composition. At least two above amounts may be combined to form the endpoints of ranges.

Commercial or municipal water treatment devices may include larger filter devices or tanks designed to attach to large high flow water pipes that provide beds positioned to receive water from a natural source during treatment. Such devices are well known in the art and the chlorine and chloramine destroying activated carbon can be included in any such device. In various embodiments, beds or tanks including granular activated carbon can be positioned at various places along the flow path of the treatment plant, and chlorine and chloramine destroying activated carbon as described above can be used by any one or all of these beds or tanks. In certain embodiments, the water may be contacted with powdered activated carbon at one or more place in the treatment path, and in such embodiments, the powdered activated carbon may be chlorine and chloramine destroying activated carbon. As discussed above, in such treatment devices, the granulated or powdered chlorine and chloramine destroying activated carbon can be used alone or in a mixture of chlorine and chloramine destroying activated carbon and non-chlorine and chloramine destroying activated carbon. The treatment devices and facilities may include various additional tanks and components, such as, for example, equalization basins, clarifiers, biological treatment basins or tanks, sand filtration devices, membrane filtration devices, and the like and combinations thereof. Alternatively, the treatment facilities may include adsorption holding tanks where powdered activated carbon is added to the water to be treated and then collected following adsorption.

Further embodiments are directed to methods for purifying water using the chlorine and chloramine destroying activated carbon described above. The step of contacting can be carried out by any means including, for example, flowing water over a bed of chlorine and chloramine destroying activated carbon or mixture of chlorine and chloramine destroying activated carbon and non-chlorine and chloramine destroying activated carbon, introducing water onto a filter including chlorine and chloramine destroying activated carbon or a mixture of chlorine and chloramine destroying activated carbon and non-chlorine and chloramine destroying activated carbon, introducing activated carbon having chlorine and chloramine destroying activated carbon or mixture of chlorine and chloramine destroying activated carbon and non-chlorine and chloramine destroying into a container for holding water, and the like, and in some embodiments, such mean for contacting can be combined. In other embodiments, the method may include additional steps. For example, in some embodiments, methods for purifying water may include the steps of filtering the water using, for example, a screen or sand filter before, after, or both before and after contacting with chlorine and chloramine destroying activated carbon or mixture of chlorine and chloramine destroying activated carbon and non-chlorine and chloramine destroying to remove particulates. In further embodiments, the methods may include the step of disinfecting the water to remove biological contaminants such as bacteria or other microorganisms, and in some embodiments, the methods may include the step of introducing a disinfectant into the water. In still further embodiments, the methods may include the step of clarifying the water, adjusting the pH of the water, and the like and combinations thereof.

The performance of the sorbents of the invention is measured in various ways, including the "chloramine destruction number" or "chlorine destruction number" which is quantified below in the experiments section. These values quantify the amount of chloramine and/or chlorine which can be removed from water by the sorbents of the invention. For the CDN or chloramine destruction number, the invention contemplates values of about 3.0, about 3.5, about 4.0, about 4.5, about 5.0, about 5.5, about 6.0, about 6.5, about 7.0, about 7.5, about 8.0, about 8.5, about 9.0, about 9.5, about 10.0, about 10.5, about 11.0, about 12.0, about 12.5, about 13.0, about 13.5, about 14.0, about 14.5, about 15.0, about 15.5, about 16.0, about 16.5, about 17.0, about 17.5, about 18.0, about, 18.5, about 19.0, about 19.5, about 20.0, about 20.5, about 21.0, about 21.5, about 22.0, about 22.5, about 23.0, about 23.5, about 24.0, about 24.5, about 25.0, about 25.5, about 26.0, about 26.5, about 27.5, about 28.0, about 28.5, about 29.0, about 29.5, about 30.0, or any range that includes at least two of these values as the endpoints. Alternatively, the CDN can be a range with these numbers as a lower performance bound, such as at least about 4.0, at least about 4.5, at least about 5.0, at least about 10.0, at least about 15.0, at least about 20.0, or at least about 23.0. In some embodiments, the chloramine destruction number is measured with respect to mono-chloramine.

The performance according to the chlorine destruction number may be about 70.0, about 75.0, about 80.0, about 85.0, about 90.0, about 95.0, about 100.0, or any range that is formed of at least two of these values as the endpoints. The performance according to the chlorine destruction number can also be at least about 70.0, at least about 75.0, at least about 80.0, at least about 85.0, at least about 90.0, at least about 95.0, at least about 100.0, or any combination of those ranges.

As will be discussed below in the Examples, it is believed that a measurable factor in the performance of the sorbents of the invention is the amount of "edge" nitrogen, which is distinct from the "center" nitrogen in that "edge" nitrogen atoms are part of a pyrole or pyridine group residing at the edge of a graphitic sheet or plane. These nitrogen atoms are the most labile and interact with the various compounds that the sorbents contact, such as chloramine and chlorine atoms. The amount of edge nitrogen can be identified by surface analysis techniques such as X-ray photoelectron spectroscopy (XPS). The amount of edge nitrogens as measured by XPS or any other surface analysis technique may be about 0.1 at. % to about 1.2 at. %, about 0.2 at. % to about 1.0 at. %, about 0.2 at. % to about 0.8 at. %, or about 0.2 at. % to about 0.6 at. %, or any combination of the above ranges. The amount of edge nitrogen can also be about 0.1 at. %, about 0.2 at. %, about 0.3 at. %, about 0.4 at. %, about 0.5 at. %, about 0.6 at. %, about 0.7 at. %, about 0.8 at. %, about 0.9 at. %, about 1.0 at. %, about 1.1 at. %, about 1.2 at. %, or any range that is formed by the combination of two of those values as endpoints of the range, again as measured by XPS or any other surface analysis technique.

EXAMPLES

Although the present invention has been described in considerable detail with reference to certain preferred embodiments thereof, other versions are possible. Therefore, the spirit and scope of the appended claims should not be limited to the description and the preferred versions contained within this specification. Various aspects of the present invention will be illustrated with reference to the following non-limiting examples.

Example 1

Activated carbon samples were tested for removal of chlorine and chloramine. Chloramine refers to mono-chloramine, di-chloramine, and tri-chloramine. When ammonia is in equilibrium with chlorine in solution the form of chloramine is pH dependent. The chloramine solution comprised ammonium chloride; sodium hypochlorite and deionized water were mixed to obtain a 1 L solution of 300 ppm chloramine at a pH of 9.0. At a pH value of 9.0, the chloramine species that is present at equilibrium is the mono-chloramine form, which is the most difficult to destroy. The solution was buffered using sodium carbonate to maintain the solution pH during evaluation. The chlorine solution comprised sodium hyprochlorite and deionized water to obtain 1 L of a 300 ppm chlorine solution. One liter of the 300 ppm respective solution was added to an Erlenmeyer flask that was placed in a water bath controlled to 20° C. A constant volume of 2.0 mL activated carbon (sized at 80×325 mesh) was added to the agitated 1 L chloramine or chlorine solution for each sample analysis. The volume of the carbon used was determined from the apparent density of the 80×325 carbon as determined by ASTM Method D-2854. The concentration of total chlorine in solution was measured at various time points over a 150 min period by taking aliquots and then analyzing using a standard HACH colorimetric EPA accepted method 10070 for total chlorine. The concentration of chloramines was measured using the NSF/ANSI-42 (2015).

Figure 2:
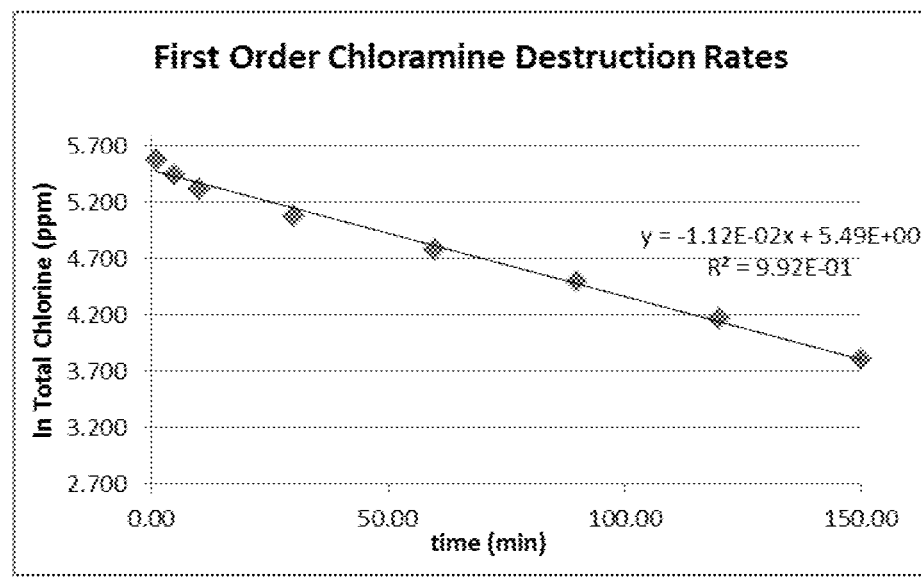
FIG. 2 is a normalized plot of the first order destruction rate of chloramine in water over time when exposed to the sorbents of the invention.

After an activated carbon is analyzed experimentally, the concentration vs. time data for each activated carbon sample (FIG. 1) is replotted as the natural log of total chlorine concentration vs. time to linearize the data according to first order kinetic theory (FIG. 2). A linear fit is then applied to the data and the slope of the linear fit is determined. The slope was always negative, since the initial concentration of total chlorine decreased over the 150 min period. As a result, the absolute value of the slope, multiplied by 1000, is used quantify the rate of chloramine and chlorine destruction (removal). The larger the absolute slope, the more effective the activated carbon is at removing chlorine and chloramine. For these experiments, the slope resulting from the linear fit of the first order kinetic experimental data (again multiplied by 1000) is referred to as the "chloramine destruction number" or CDN. In the case of chlorine destruction this rate is referred to as the "chlorine destruction number" of Cl-DN.

In addition to chloramine, this invention is also effective at removing chlorine from aqueous streams. The ability of the calcined activated carbon to remove chlorine was assessed as described above, however the test solution is made without the addition of ammonium chloride, and therefore the solution contains 300 ppm chlorine. Activated carbon particle size for chlorine analysis was 95% −325 mesh. The analysis of the chlorine concentration vs. time data and its first order kinetic slope remains the same, however, and the slope of the linear fit of this data is referred to as the "chlorine destruction number" or Cl-DN.

Example 2

Two types of coal-based activated carbon were used as feedstock. F400 is a coal based activated carbon (Calgon Carbon Corp) and CENTAUR (Calgon Carbon Corp) is a coal based activated carbon that has been prepared according to U.S. Pat. No. 6,342,129. Samples in Table 1 identified as being oxidized were oxidized in a tube furnace at 500° C. for one hour with air. After the samples were cooled, samples identified as having urea addition were impregnated with a 50% urea in water solution at a ratio of 4 mL of urea solution to 10 grams of carbon. Calcination was carried out in a tube furnace at 950° C. for one hour in nitrogen followed by cooling in nitrogen. Activations were carried out in a tube furnace at 950° C. for 15 minutes in a steam environment. Preoxidation of activated carbon increases final nitrogen content of the activated carbon. This is shown in Table 1, where in each case, the preoxidized samples contained more nitrogen (Total Nitrogen, wt. %), as determined by elemental analysis (Galbraith Labs) than its non-oxidized counterpart. All samples were treated with same amount of urea precursor. Additionally, the preoxidized samples had higher CDN values and therefore were more effective at destroying chloramine.

TABLE 1

Effect of Pre-oxidation and Urea Addition on Nitrogen Content and Chloramine Destruction Characteristics of Activated Carbon

| Activated Carbon | Thermal Treatment | CDN | Total Nitrogen (wt. %) |
| --- | --- | --- | --- |
| F400 & Urea Addition | Steam Activated | 3.9 | 0.98 |
| F400, Preoxidized, & Urea Addition | Steam Activated | 4.8 | 1.04 |
| F400 & Urea Addition | Calcined | 4.2 | 1.10 |
| F400, Preoxidized, & Urea Addition | Calcined | 10.8 | 1.62 |
| F400, Preoxidized | Steam Activated | 2.0 | 0.77 |
| F400, Preoxidized | Calcined | 2.8 | 0.69 |
| F400 | Steam Activated | 2.3 | 0.94 |
| F400 | Calcined | 1.9 | 0.78 |
| F400 | No Treatment | 1.4 | 0.67 |
| F400, Preoxidized | No Treatment | 2.2 | 0.53 |
| Centaur & Urea Addition | Steam Activated | 6.2 | 1.43 |
| Centaur, Preoxidized, & Urea Addition | Steam Activated | 11.0 | 1.63 |
| Centaur & Urea Addition | Calcined | 11.8 | 1.18 |
| Centaur, Preoxidized, & Urea Addition | Calcined | 21.8 | 2.00 |
| Centaur, Preoxidized | Steam Activated | 4.5 | 0.91 |
| Centaur, Preoxidized | Calcined | 6.2 | 1.26 |
| Centaur | Steam Activated | 3.7 | 1.28 |
| Centaur | Calcined | 5.2 | 1.08 |
| Centaur | No Treatment | 3.1 | 1.09 |
| Centaur, Preoxidized | No Treatment | 3.6 | 0.97 |

Figure 3:
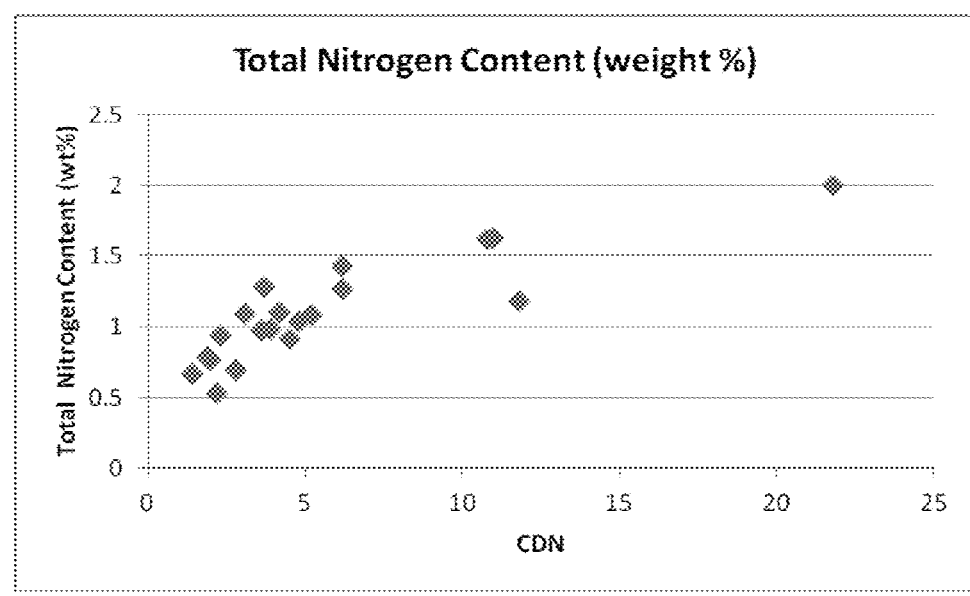
FIG. 3 is a plot of total nitrogen content and plotted corresponding to the destruction of chloramine in water.

In the prior art, the presence of the activating or oxidizing gas at high temperature has the negative effect of reducing product yield and potentially reducing the nitrogen content of the final product through attack of the carbon structure by oxygen at high temperatures. Table 1 demonstrates the effectiveness and benefit of the calcination step because the CDN values for all calcined samples are higher than the CDN values of activated samples. This was true for both non-oxidized and preoxidized activated carbons, although the highest CDN values were obtained when the activated carbon is preoxidized. FIG. 3 graphically represents to relationship between total nitrogen and CDN values.

Example 3

One can further characterize the type of nitrogen incorporated into the activated carbon using x-ray photoelectron spectroscopy (XPS). This method was applied to the activated carbon samples listed in Table 1. The types nitrogen present in the activated carbon are characterized as either an "edge" nitrogen or a "center" nitrogen. In the "edge" nitrogen, the nitrogen atom is part of a pyrole or pyridine group residing at the end or edge of a graphitic sheet or plane, and the "edge" nitrogen is identified during XPS analysis by having a binding energy of −399 eV.

In the "center" nitrogen, the nitrogen atom is bonded as part of the internal structure of several fused aromatic rings. The center nitrogen has a characteristic binding energy of −401 eV when analyzed using XPS. In the embodiments disclosed, as one examines the type of nitrogen present in the urea treated F400 or Centaur activated carbons of Table 1, there is a notable increase in the percentage of "edge" type nitrogen when the sample is calcined vs. steam activated. This trend is highlighted in Table 2.

of edge nitrogen are produced when the activated carbon is inertly calcined and that these samples exhibit superior, faster chloramine removal kinetics than their steam activated (and thus gasified) counterparts.

Figure 4:
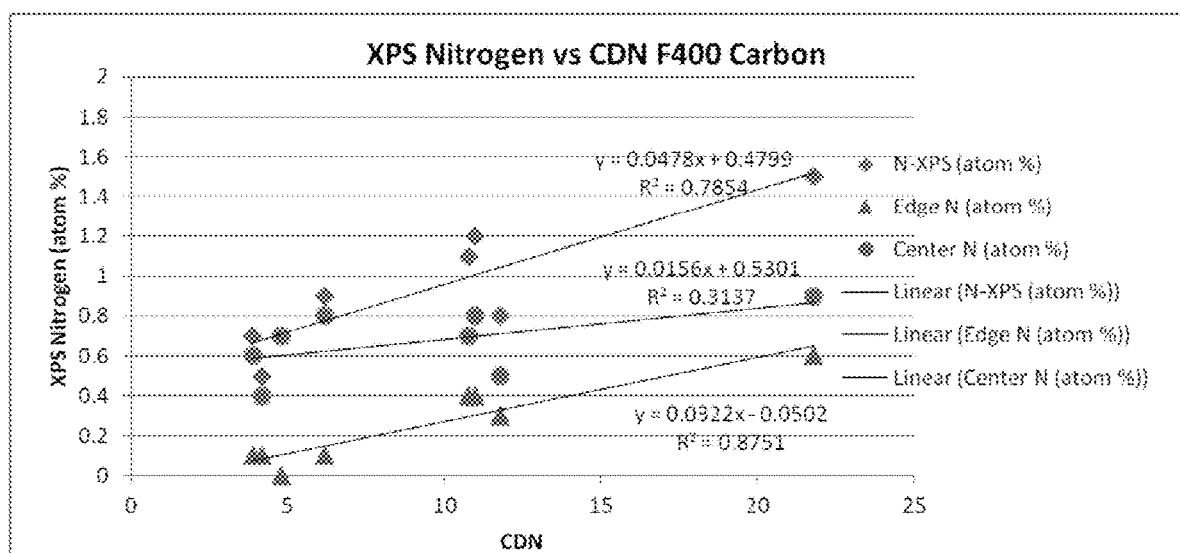
FIG. 4 is a plot of the nitrogen content as measured by XPS analysis and plotted corresponding to the destruction of chloramine in water.

FIG. 4 shows the effect of the various forms of nitrogen on the CDN. The amounts of nitrogen in each instance were determined by XPS. As total atomic nitrogen increased, so did the CDN value. Of special note is that the increase in the total atomic nitrogen by XPS is primarily due to an increase in the edge nitrogen and not the center nitrogen. The edge nitrogen is the most chemically labile nitrogen during the gasification or activation step(s). However, during calcination, the edge nitrogen tends to remain with the carbon structure.

While not wishing to be bound by theory, the results appear to indicate that the proposed nitrogen treatments result in an increase in edge nitrogen, and that most of the increase in total or bulk nitrogen, which includes center and edge nitrogen, is the result of this addition in the edge nitrogen. This is important because it is the edge nitrogen which influences surface interactions on the sorbent and therefore the performance of the sorbent.

Example 4

Table 3 demonstrates the effect of added water or steam into the air atmosphere used for oxidation. To test this effect, F400 carbon was first oxidized in air without added water at 500° C. for one hour in a tube furnace and subsequently impregnated with urea solution and calcined as provided in Example 2 above. The results of this test are shown in Table 3 as the "Dry Air" sample.

TABLE 2

Comparison of Edge to Center Nitrogen in Urea Treated Activated Carbon

| Activated Carbon | Thermal Treatment | CDN | N-XPS (atom %) | Edge N (%) | Center N (%) | Edge N (atom %) | Center N (atom %) |
|---|---|---|---|---|---|---|---|
| F400 & Urea Addition | Steam Activated | 3.9 | 0.7 | 14.3 | 85.7 | 0.10 | 0.60 |
| F400 & Urea Addition | Calcined | 4.2 | 0.5 | 20 | 80 | 0.10 | 0.40 |
| F400, Preoxidized, & Urea Addition | Steam Activated | 4.8 | 0.7 | 0 | 100 | 0.00 | 0.70 |
| F400, Preoxidized, & Urea Addition | Calcined | 10.8 | 1.1 | 36.4 | 63.6 | 0.40 | 0.70 |
| Centaur & Urea Addition | Steam Activated | 6.2 | 0.9 | 11.1 | 88.9 | 0.10 | 0.80 |
| Centaur & Urea Addition | Calcined | 11.0 | 1.2 | 33.3 | 66.7 | 0.40 | 0.80 |
| Centaur, Preoxidized, & Urea Addition | Steam Activated | 11.8 | 0.8 | 37.5 | 62.5 | 0.30 | 0.50 |
| Centaur, Preoxidized, & Urea Addition | Calcined | 21.8 | 1.5 | 40 | 60 | 0.60 | 0.90 |

In all embodiments, the calcined activated carbons show increased percentages of nitrogen in the edge form versus the center form when compared to activated carbons that have been steam activated. All of the calcined samples also have CDN values that are higher than those samples which were steam activated. In some instances, the CDN values can nearly double for samples which were calcined versus samples which were only steam activated. It is a novel and unexpected finding of this invention that that larger fractions Next, F400 carbon was provided along with humidified air that was saturated with water vapor at 25° C. The F400 carbon and humidified air was then heated to 500° C. for one hour in a tube furnace and subsequently impregnated with urea solution and calcined as provided in Example 2 above. The results of this test are shown in Table 3 as the "Humidified Air" sample. Table 3 shows that there is a significant improvement in the CDN of the carbon when water is used in conjunction with the primary oxidant, in this case, air.

TABLE 3

Effect of Water on the Air Oxidation of F400 Carbon at 500° C.

| Oxidation Atmosphere | CDN |
|---|---|
| Dry Air | 10.8 |
| Humidified Air | 16.4 |

Example 5

The effect of different nitrogen containing precursors and their ability to impart catalytic activity on the activated carbon are provided in Table 4. For these tests, all nitrogen containing precursors were added to F400 carbon at a ratio of one mole of nitrogen to 10 moles of carbon from the activated carbon. For the purposes of calculating the molar amount of nitrogen to add via nitrogen containing precursors for this experiment, it was assumed that the activated carbon was composed entirely, or 100%, of carbon atoms.

Nitrogen containing precursors identified as "Dry" in Table 4 were added as a dry admix to the oxidized activated carbon due to the lack of water solubility. Those listed as "Gas" were used in the gas form after air oxidation of the activated carbon. Materials were thermally treated as given in Example 2. From the experimental data shown in Table 4, only those nitrogen containing precursors containing nitrogen in the −3 oxidation state provided any substantial increase in CDN values over those in other oxidation states.

It is also contemplated that the source of nitrogen may be added to or in the feedstock itself. In one experiment, polyacrylonitrile was provided as the nitrogen precursor with carbon as a dry admix. This resulted in a CDN of 4.6. While not wishing to be bound by theory, it is believed that thermal decomposition of the polyacrylonitrile polymer resulted in nitrogen compounds reacting with the carbon skeleton and having an effecting the destruction of chloramine and similar compounds.

TABLE 4

Effect of Nitrogen Containing Precursor on CDN for F400 Carbon

| Nitrogen Source | Nitrogen Oxidation State | CDN |
|---|---|---|
| Polyacrylonitrile (PAN) | −3 | 4.6 |
| Ammonia (Gas) | −3 | 6.8 |
| Ammonium Carbonate (Dry) | −3 | 11.6 |
| Ammonium Thiocyanate | −3 | 25.8 |
| Azodicarbonamide (Dry) | −3 | 12.5 |
| Diammonium Phosphate | −3 | 2.0 |
| Dicyandiamide | −3 | 15.3 |
| Guanidine Hydrochloride | −3 | 24.9 |
| Guanidine Thiocyanate | −3 | 3.0 |
| Guanine (Dry) | −3 | 22.3 |
| Melamine (Dry) | −3 | 26.2 |
| Nitrogen (Gas) | 0 | 1.9 |
| Nitrogen Dioxide (Gas) | 4 | 2.6 |
| Nitrous Oxide (Gas) | −3 and +5 | 11.4 |
| Sodium Nitrate | +5 | 1.7 |
| Sodium Nitrite | +3 | 1.6 |
| Thiourea | −3 | 14.1 |
| Urea | −3 | 11.4 |

Example 6

Preoxidized, calcined activated carbon was also assessed for chlorine destruction, characterized by the Cl-DN value. Table 3 highlights the performance of CENTAUR as a feedstock material. Materials were prepared as provided in Example 2 above.

TABLE 5

Chlorine Destruction Performance of Calcined Activated Carbons Activated Carbon

| Activated carbon | Thermal Treatment | Cl-DN |
|---|---|---|
| Centaur | Steam Activated | 72.8 |
| Centaur, Preoxidized, No Urea Addition | Calcined | 84.6 |
| Centaur, Preoxidized, Urea Addition | Calcined | 145.9 |

In Table 5, the Cl-DN of steam activated Centaur feedstock was 72.8. If the CENTAUR is preoxidized and then calcined without the addition of a urea nitrogen containing precursor, the Cl-DN still improves to almost 85. However, as was the case in chloramine, if the Centaur activated carbon is used as the starting material and is preoxidized, mixed with urea, and then calcined, the Cl-DN increases dramatically to 145.9. This significant increase in the Cl-DN value indicates that when the activated carbon is preoxidized, mixed with a nitrogen source in the −3 oxidation state, and calcined, it is very effective for removing chlorine.

The invention claimed is:

1. A method for making a sorbent, comprising the steps of:
   (a) providing a sorbent feedstock which has not been exposed to a nitrogen containing precursor and selected from the group consisting of activated carbon,
   (b) oxidizing the sorbent feedstock to form an oxidized sorbent feedstock,
   (c) adding a nitrogen containing precursor to the oxidized sorbent feedstock, wherein the nitrogen containing precursor is a reduced nitrogen compound,
   (d) heating the oxidized sorbent feedstock exposed to nitrogen containing precursor in step (c) to a temperature of at least about 400° C. under an inert atmosphere to form a calcined sorbent feedstock, and
   (e) cooling the calcined sorbent feedstock under the inert atmosphere immediately after the heating step,
   wherein the steps (a) to (e) is conducted in the order from (a) to (e), and
   wherein the sorbent feedstock, oxidized sorbent feedstock, or calcined sorbent feedstock are not subsequently activated with one or more of $H_2O$, $CO_2$, $O_2$, or any combination thereof.

2. The method of claim 1, wherein the nitrogen containing precursor has an oxidation state of −3.

3. The method of claim 2, wherein the nitrogen containing precursor is selected from the group consisting of ammonia, ammonium salts, ammonium carbonate and bicarbonate, ammonium thiocyanate, azodicarbonamide, diammonium phosphate, dicyandiamide, guanidine hydrochloride, guanidine thiocyanate, guanine, melamine, thiourea, urea, and combinations thereof.

4. The method of claim 1, wherein the step of heating takes place at a temperature of at least about 700° C.

5. The method of claim 1, wherein the activated carbon or the reactivated carbon is formed from bituminous coal, sub-bituminous coal, lignite coal, anthracite coal, peat, nut shells, pits, coconut shell, babassu nut, macadamia nut, dende nut, peach pit, cherry pit, olive pit, walnut shell, wood, lignin, polymers, resins, petroleum pitches, rice hulls, bagasse, corn stalks, wheat hulls, graphenes, carbon nanotubes, and combinations thereof.

6. The method of claim 5, wherein the activated carbon or the reactivated carbon has a total nitrogen content of about 0.5 wt. % to about 1.5 wt. %.

7. The method of claim 1, wherein the steps of oxidizing, adding a nitrogen containing precursor, and heating are each individually performed from one to six (1-6) times.

8. The method of claim 1, wherein the sorbent feedstock has a mean particle diameter of about 1 μm to about 4 mm.

9. The method of claim 1, wherein the formed sorbent has a chloramine destruction number (CDN) of at least about 4.0;
wherein the CDN is the absolute value of the first order linear kinetic fit, multiplied by 1000, that is applied to natural log of a concentration of chloramine in water versus time;
wherein the initial concentration of chloramine is decreased over a period of 150 minutes.

10. The method of claim 9, wherein the formed sorbent has a CDN of about 10.0 to about 30.0.

11. The method of claim 9, wherein the CDN is based on the destruction of monochloramine.

12. The method of claim 1, wherein the formed sorbent has a chlorine destruction number (Cl-DN) of at least about 80.0,
wherein the Cl-DN is the absolute value of the first order linear kinetic fit, multiplied by 1000, that is applied to natural log of a concentration of chlorine in water versus time,
wherein the initial concentration of chlorine is decreased over a period of 150 minutes.

13. The method of claim 12, wherein the Cl-DN value is about 80.0 to about 100.0.

14. The method of claim 1, wherein the formed sorbent has a nitrogen edge concentration of at least about 0.20 atom %.

15. The method of claim 14, wherein the formed sorbent has a nitrogen edge concentration of about 0.20 atom % to about 1.2 atom %.

16. The method of claim 1, wherein the step of oxidizing the sorbent feedstock is conducted in the temperature range of about 400° C. to about 900° C.

17. The method of claim 1, wherein the step of oxidizing the sorbent feedstock is performed in a dry atmosphere.

18. The method of claim 1, wherein the step of oxidizing the sorbent feedstock is performed in a humidified atmosphere.

19. The method of claim 1, wherein the nitrogen containing precursor is in a form of water solution and is added to the oxidized sorbent feedstock in an amount of about 50%.

20. The method of claim 1, wherein the nitrogen containing precursor is in a form of water solution and is added to the oxidized sorbent feedstock at a ratio of about 4 mL of the solution to 10 grams of the oxidized sorbent feedstock.

21. A method for making a sorbent, comprising the steps of:
(a) providing a sorbent feedstock,
(b) oxidizing the sorbent feedstock to form an oxidized sorbent feedstock,
(c) adding a nitrogen containing precursor to the oxidized sorbent feedstock, wherein the nitrogen containing precursor is a reduced nitrogen compound,
(d) heating the oxidized sorbent feedstock exposed to nitrogen containing precursor in step (c) to a temperature of at least about 400° C. under an inert atmosphere to form a calcined sorbent feedstock, and
(e) cooling the calcined sorbent feedstock under the inert atmosphere immediately after the heating step (d) without activation of the calcined sorbent feedstock with one of $H_2O$, $CO_2$, $O_2$, or any combination thereof,
wherein the steps (a) to (e) is conducted in the order from (a) to (e), and
further comprising a step of adding a sorbent feedstock which has not been treated in the amount of about 5 wt. % to about 95 wt. % based on the total amount of the formed sorbent.

22. A sorbent formed by a method comprising the steps of:
(a) providing a sorbent feedstock which has not been exposed to a nitrogen containing precursor and selected from the group consisting of activated carbon,
(b) oxidizing the sorbent feedstock to form an oxidized sorbent feedstock,
(c) adding a nitrogen containing precursor to the oxidized sorbent feedstock, wherein the nitrogen containing precursor is a reduced nitrogen compound,
(d) heating the oxidized sorbent feedstock exposed to nitrogen containing precursor in step (c) to a temperature of at least about 400° C. under an inert atmosphere to form a calcined sorbent feedstock, and
(e) cooling the calcined sorbent feedstock under the inert atmosphere immediately after the heating step,
wherein the steps (a) to (e) is conducted in the order from (a) to (e), and
wherein the sorbent feedstock, oxidized sorbent feedstock, or calcined sorbent feedstock are not subsequently activated with one or more of $H_2O$, $CO_2$, $O_2$, or any combination thereof.

23. The sorbent of claim 22, wherein the nitrogen containing precursor has an oxidation state of −3.

24. The sorbent of claim 23, wherein the nitrogen containing precursor is selected from the group consisting of ammonia, ammonium carbonate and bicarbonate, ammonium thiocyanate, azodicarbonamide, diammonium phosphate, dicyandiamide, guanidine hydrochloride, guanidine thiocyanate, guanine, melamine, thiourea, urea, and combinations thereof.

25. The sorbent of claim 22, wherein the sorbent feedstock has a mean particle diameter of about 1 μm to about 4 mm.

26. The sorbent of claim 22, wherein the sorbent has a chloramine destruction number (CDN) of at least about 4.0,
wherein the CDN is the absolute value of the first order linear kinetic fit, multiplied by 1000, that is applied to natural log of a concentration of chloramine in water versus time,
wherein the initial concentration of chloramine is decreased over a period of 150 minutes.

27. The sorbent of claim 26, wherein the CDN is about 10.0 to about 30.0.

28. The sorbent of claim 27, wherein the CDN is based on the destruction of monochloramine.

29. The sorbent of claim 22, wherein the sorbent has a chlorine destruction number (Cl-DN) of at least about 80.0,
wherein the Cl-DN is the absolute value of the first order linear kinetic fit, multiplied by 1000, that is applied to natural log of a concentration of chlorine in water versus time,
wherein the initial concentration of chlorine is decreased over a period of 150 minutes.

30. The sorbent of claim 29, wherein the CDN is about 80.0 to about 100.0.

31. The sorbent of claim 22, wherein the sorbent has a nitrogen edge concentration of at least about 0.20 atom %.

32. The sorbent of claim 31, wherein sorbent has a nitrogen edge concentration of about 0.20 atom % to about 1.2 atom %.

33. A filter assembly comprising the sorbent of claim 22.

34. The sorbent of claim 22, wherein the activated carbon or the reactivated carbon is formed from one or more of bituminous coal, lignite coal, anthracite coal, peat, nut shells, pits, coconut shell, babassu nut, macadamia nut, dende nut, peach pit, cherry pit, olive pit, walnut shell, wood, lignin, polymers, resins, petroleum pitches, bagasse, rice hulls, corn husks, wheat hulls and chaff, graphenes, and carbon nanotubes.

35. The sorbent of claim 34, wherein the activated carbon or the reactivated carbon has a total nitrogen content of about 0.5 wt. % to about 1.5 wt. %.

36. A sorbent formed by a method comprising the steps of:
(a) providing a sorbent feedstock,
(b) oxidizing the sorbent feedstock to form an oxidized sorbent feedstock,
(c) adding a nitrogen containing precursor to the oxidized sorbent feedstock, wherein the nitrogen containing precursor is a reduced nitrogen compound,
(d) heating the oxidized sorbent feedstock exposed to nitrogen containing precursor in step (c) to a temperature of at least about 400° C. under an inert atmosphere to form a calcined sorbent feedstock, and
(e) cooling the calcined sorbent feedstock under the inert atmosphere immediately after the heating step (d) without activation of the calcined sorbent feedstock with one of $H_2O$, $CO_2$, $O_2$, or any combination thereof, wherein the steps (a) to (e) is conducted in the order from (a) to (e), and further comprising a sorbent feedstock which has not been treated in the amount of about 5 wt. % to about 95 wt. % based on the total amount of the sorbent.

* * * * *